INVENTOR
JOHN D. RYDER
BY
Raymond W. Junkins
ATTORNEY

Fig. 3

Sept. 17, 1940.   J. D. RYDER   2,215,254
TELEMETRIC SYSTEM
Filed May 2, 1936   5 Sheets-Sheet 3

FIG. 4

INVENTOR
JOHN D. RYDER
BY Raymond D. Junkins
ATTORNEY

FIG. 5

Sept. 17, 1940.  J. D. RYDER  2,215,254
TELEMETRIC SYSTEM
Filed May 2, 1936  5 Sheets-Sheet 5

Fig. 6

INVENTOR
JOHN D. RYDER
BY
ATTORNEY

Patented Sept. 17, 1940

2,215,254

UNITED STATES PATENT OFFICE 2,215,254

TELEMETRIC SYSTEM

John D. Ryder, South Euclid, Ohio, assignor to Bailey Meter Company, a corporation of Delaware Application May 2, 1936, Serial No. 77,488

32 Claims. (Cl. 177—351)

This invention relates to telemetric systems for remotely indicating, recording, integrating or otherwise exhibiting the magnitude of a variable, such as rate of flow, pressure, temperature, electromotive force, conductivity, etc.

In accordance with my invention, variations in the magnitude of a variable being measured are effective for changing the normal phase relationship existing between electric impulses of predetermined frequency, and such changes are then utilized to maintain correspondence between the measurements taken at the transmitting station and the indications made at the receiving station.

Further in accordance with my invention, the electrical impulses originated at the transmitting and receiving stations may be used solely to control the input circuits of suitable electron discharge devices so that the receiving station may be located at a great distance from the transmitting station without the necessity of employing electrical connections of undue size. Due to the small currents necessary to control the input circuits, contacts and other mechanical mechanisms may be of light construction, materially increasing the accuracy of the device.

Further in accordance with my invention as embodied in novel circuit arrangements, the transmitting device may be utilized to actuate a plurality of receiving devices of inherently different characteristics.

For an understanding of my invention and for illustration of some of the forms it may take, reference may be had to the following description and to the drawings, in which.

Figures 1, 2:
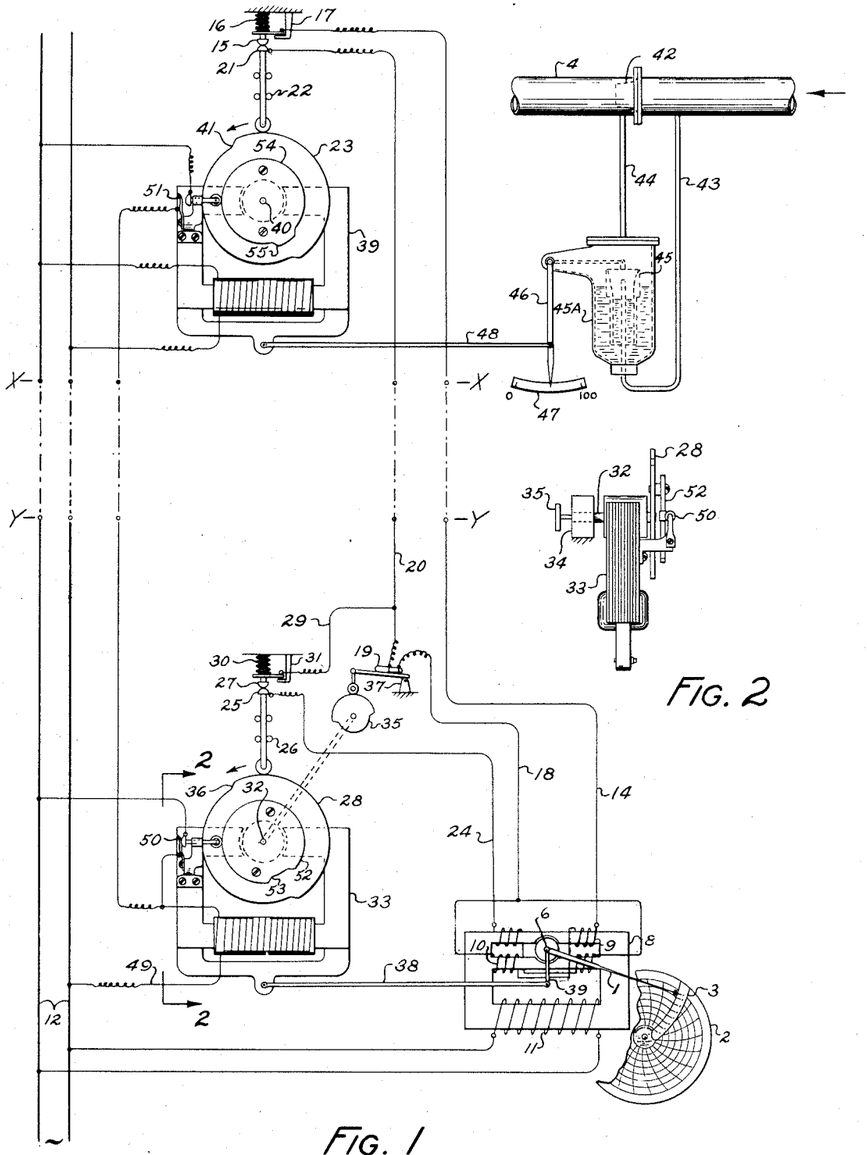
Fig. 1 illustrates diagrammatically a telemetric system for recording rate of fluid flow.
Fig. 2 is an end elevation taken on the line 2—2 of Fig. 1.

Referring to Fig. 1, I have therein shown a transmitting station located above the line X—X and a receiving station located below the line Y—Y, which are connected by suitable electrical conductors. In the receiving station is an indicator arm 1 arranged to record on a time rotatable chart 2 and indicate relative to a scale 3 the rate of flow of fluid through a conduit 4 located adjacent the transmitting station. A distance of a few feet or several miles may intervene between the transmitting and receiving stations. The arrangement shown in Fig. 1 is particularly adapted for installations wherein a short or moderate distance intervenes between the transmitting and receiving stations. For greater distances I prefer to use other embodiments of my invention later to be described.

The indicator 1 is driven by a reversible induction motor 8 having a rotor 6, wound opposed shading poles 9 and 10 and an energizing winding 11 connected to a source 12. A short circuiting of the winding 9 serves to produce rotation of the motor in one direction, whereas short circuiting of the winding 10 serves to produce rotation in opposite direction. If the windings 9 and 10 are concurrently short-circuited the motor is not urged to rotation in either direction. The connection between rotor 6 of the motor 8 and indicator 1 is shown diagrammatically and may, as is well known, include the necessary reducing gears so that any desired number of revolutions of the motor 8 will position the indicator 1 from the minimum to maximum reading of the chart 2 and scale 3.

One side of the shading pole winding 9 is connected through a conductor 14 with a contact 15 normally urged by a spring 16 toward a stop 17. The other side of the shading pole winding 9 is connected by a common conductor 18 to a mercury switch 19 and thence by a conductor 20 to a contact member 21 constrained to motion along its vertical center line by guides 22 and positioned into and out of engagement with the contact 15 by a rotatable cam 23. Engagement of the contact member 21 with the contact 15 short circuits the winding 9 and urges the motor 8 to rotation in predetermined direction.

Similarly, one side of the opposed shading pole winding 10 is linked through conductor 24 to a contact member 25 constrained to motion along its vertical center line by guides 26 and positioned into and out of engagement with a contact 27 by a rotatable cam 28. The other side of the opposed winding 10 is linked through the common conductor 18, mercury switch 19, and conductor 29 to the contact 27, which is normally urged by a spring 30 toward a stop 31. Engagement of the contact 25 with the contact 27 serves to short circuit the opposed winding 10, which urges the motor 8 to rotation in opposite direction than that produced by short circuiting of the winding 9.

The cam 28 is secured to a shaft 32 of a self-starting synchronous motor 33 energized from the source 12. The construction and arrangement of parts is shown more clearly in Fig. 2, and as therein illustrated the motor 33, cam 28 and rotor 32 are supported by and angularly positionable about a stationary bearing 34. A cam 35 is secured to the rotor 32 which extends rearwardly through the bearing 34. The motor 33 may contain suitable integral reduction gears (not shown) to produce any desired angular velocity of the cams 28 and 35.

The cam 28 is provided with a raised section 36 which serves to periodically bring the contact member 25 into engagement with the contact 27, short circuiting the winding 10. While the contact member 25 is in engagement with the contact 27 the circuit through the winding 10 is arranged to be broken by the mercury switch 19, which is pivoted to a suitable support 37 and adapted to be periodically tilted by the cam 35. Thus, as shown for example, the raised section 36 of cam 28 may extend through 180 degrees and the raised section of the cam 35 likewise through 180 degrees but 90 degrees out of alignment with the former. At 90 degrees therefore, before the contact member engages the raised section 36 the mercury switch 19 will close, so that upon engagement of the contact 25 with the contact 27 the winding 10 will be short circuited. However, 90 degrees before the contact member 25 leaves the raised section 36, the mercury switch 19 will be tilted to break the circuit to the winding 10.

The motor 33 is adapted to be positioned about the shaft 32 by the motor 8 to which it is connected by a pivoted member 38 and an arm 39 of the indicator 1. As shown, when the motor 8 rotates in a direction to move the indicator 1 upwardly the motor 33 and cams 28 and 35 will be positioned in a counterclockwise direction.

Located in the transmitting station is a synchronous motor 39, having a rotor 40 for driving the cam 23. The motor 39 is similar to the motor 33 and is angularly positionable about the center of rotation of the shaft 40 which may be journaled in a suitable stationary bearing. The cam 23 is provided with a raised section 41 which serves to periodically bring the contact member 21 into engagement with the contact 15. Such engagement is effective for short circuiting the winding 9 of the motor 8 until the circuit is broken through action of the cam 35 and mercury switch 19.

Located within the conduit 4 is a restriction shown as a flow nozzle 42 for producing a differential pressure bearing a functional relation to the rate of flow of fluid. The pressures existing at the inlet and outlet of the restriction 42 are transmitted through pipes 43 and 44 to the interior and exterior respectively of a shaped bell 45 sealed by a suitable fluid, such as mercury contained in a pressure casing 45A. Mechanically connected to the bell is an indicator arm 46 adapted to cooperates with an index 47 for advising the rate of flow of fluid through the conduit 4. Such a meter is illustrated as a known type wherein the bell 45 is provided with a wall of material thickness whereby the quadratic relation between differential pressure across the restriction 42 and rate of flow therethrough is converted to a linear relation, to the end that positioning of the indicator 46 relative to the index 47 is in equal increments directly proportional to the rate of flow of fluid. The indicator arm 46 is pivotally connected to the motor 39 by a member 48. Upon an increase in the rate of flow of fluid through the conduit 4 for example, positioning the bell 45 upwardly, the indicator arm 46 will be positioned in a counterclockwise direction which will effect similar positioning of the motor 39 about the center of the shaft 40.

In operation after the mechanism has been properly adjusted so that the cam 28 is in proper phase relation to the cam 23, whereby the contact member 25 engages the contact 27 at the same instant that the contact member 21 engages the contact 15, and the indicator 1 is in proper correspondence with the indicator arm 46, so long as the rate of flow through the conduit 4 remains constant the windings 9 and 10 will be short circuited at the same instant, so that the rotor 6 will not be urged to rotation. Likewise the windings will be deenergized at the same instant, due to the action of the cam 35 and mercury switch 19. Assume now that the rate of flow of fluid through the conduit 4 increases a certain amount; the indicator arm 46 will be positioned in a counterclockwise direction a proportionate amount effecting a similar positioning of the motor 39 about the shaft 40. Such positioning will advance the instant when the contact member 21 will engage the contact 15, to short circuit the winding 9 of the motor 8. The instant when the contact member 25 engages the contact 27 will however remain the same, so that there will be an increment of time in length proportional to the positioning of the motor 39 when the winding 9 only will be short circuited, thereby urging the rotor 6 to rotation in a direction to raise the indicator 1 relative to the chart 2. Such rotation of the rotor 6 will likewise cause counterclockwise positioning of the motor 33 in amount proportional to the upward positioning of the indicator 1. Such positioning of the indicator 1 and motor 33 will continue periodically until they are again in proper correspondence with the position of the indicator arm 46, when the contact arm 25 will engage the contact 27 at the same instant that the contact member 21 engages the contact 15. Thereafter engagement will occur simultaneously until there is a further change in the rate of flow of fluid through the conduit 4.

Decreases in the rate of flow of fluid through the conduit 4 act to retard the engagement of the contact member 21 with the contact 15 proportionately, and thereby effect short circuiting of the winding 9 after short circuiting of the winding 10 has occurred, through engagement of the contact member 25 with the contact 27. So long as the winding 10 alone is short circuited, the rotor 13 will rotate to position the indicator 1 downwardly relative to the chart 2 and also to position the motor 33 in a clockwise direction, thereby retarding the instant when the contact member 25 will engage the contact 27.

While the motor 33 is shown energized from the source 12, as is the motor 39, occasionally due to back lash in the internal gearing, friction, etc. the cam 28 may slightly lead or lag the cam 23. If provision is not made for correcting such changes an inaccuracy will result in the reading of the indicator 1. To prevent this I show means for periodically correcting the position of the cam 28 relative to the cam 23 so that they are continuously maintained in proper phase relationship relative to their respective motors.

The motor 33 is shown connected to one side of the source 12 by a conductor 49. The opposite side of the motor winding is shown connected to the other side of the source 12 through contacts 50 and 51 arranged in parallel. The contact 50 is normally closed, whereas the contact 51 is normally open. As shown however, one part of the contact 50 forms a follower for a cam 52 concentric with an secured to the cam 28. Accordingly once each revolution the contact 50 is opened, due to a depression 53 in the contour of the cam 52.

Concentric with and secured to the cam 23 is a cam 54 for actuating the contact 51. Normally the surface of the cam 54 is such that the contact 51 is open circuited. Once each revolution of the cam 54, however, the contact 51 is closed due to a raised section 55 in the contour of the cam 54. If the cams 28 and 23 are in proper phase relation with respect to the motors 33 and 39, the instant the contact 50 is opened the contact 51 will be closed, whereby the motor 33 will be continuously energized from the source 12. However, if for any reason the position of the cam 28 with respect to the motor 33 is different than the position of the cam 23 with respect to the motor 39, the operation of the contacts 50 and 51 will not occur simultaneously, so that the motor 33 will be deenergized for a part of each revolution of the motor 39 until proper phase relationship is again restored.

Figure 3:
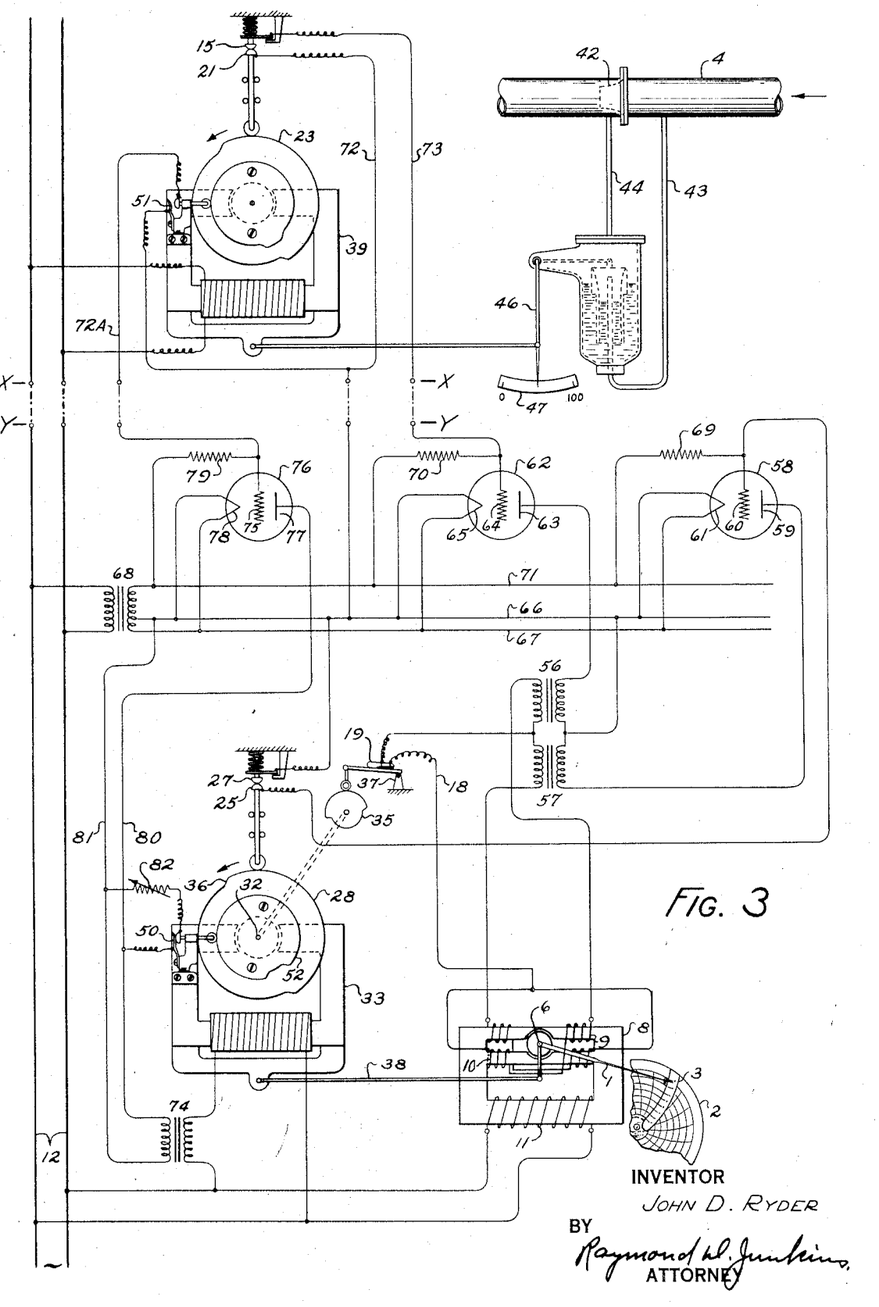
Fig. 3 illustrates an alternate form of circuit arrangement.

In Fig. 3 is shown a modified form of my invention which is preferably employed when the transmitting station is located at a considerable distance from the receiving station. Therein the arrangement is such that only current sufficient to control the grids of suitable electron discharge devices is transmitted from one station to the other, so that relatively small conductors, such as ordinary telephone cables, are suitable.

In the embodiment illustrated in Fig. 3 the winding 9 is shown connected to the primary of a transformer 56 and the winding 10 to the primary of a similar transformer 57. The mercury switch 19 is shown connected in the common conductor 18 and serves, as in Fig. 1, to simultaneously open circuit the windings 9 and 10.

The secondary of the transformer 57 is shown connected in the output circuit of an electron discharge device 58 having a anode 59, a grid 60, and a cathode 61. The secondary of the transformer 56 is shown connected in the output circuit of a similar electron discharge device 62 having an anode 63, a grid 64, and a cathode 65. In order that the cathodes 61 and 65 may, if necessary, be heated to the temperature necessary for proper operation they may be connected to the conductors 66, 67 leading to the secondary of a multi-tap transformer 68, the primary of which is connected across the source 12. The grids 60 and 64 are connected through resistances 69 and 70 to a conductor 71, also leading to the secondary of the transformer 68.

The arrangement is such that during the half cycle when the anodes 59, 63 are positive with respect to the cathodes 61, 65 respectively the grids 60, 64 are negative, thereby rendering the electron discharge devices 58, 62 non-conducting. During the half cycle when the grids 60, 64 are positive with respect to the cathodes 61, 65 the anodes 59, 63 are negative with respect thereto, thereby again rendering the devices non-conducting. Whenever the electron discharge devices 58, 62 are non-conducting the secondaries of the transformers 56, 57 are open circuited, increasing the impedance of their respective primaries to a point where substantially no current passes through the windings 9, 10 and to rotor 6 of the motor 8 is not urged to rotation in either direction.

The contact 27 is connected to the conductor 66 and the contact 25 to the grid 60 of the device 58. Upon engagement of the contact 25 with the contact 27 a potential substantially the same as that of the cathode 61 is impressed upon the grid 60, thereby rendering the device 58 conducting during the half cycle when the anode 59 is positive with respect to the cathode 61. The secondary of the transformer 57 is then substantially short circuited, decreasing the impedance of the primary sufficiently so that a material current will pass through the winding 10, urging the rotor of the motor 8 to rotation in predetermined direction.

The contact member 21 is connected through a conductor 72 to the conductor 66 and the contact 15 through a conduit 73 with the grid 64 of the electron discharge device 62. Upon engagement of the contact member 21 with the contact 15 a potential substantially equal to that of the cathode 65 will be impressed upon the grid 64, thereby rendering the device 62 conducting, decreasing the impedance of the primary of the transformer 56 sufficiently so that material current will pass through the winding 9 urging the rotor 13 to rotation in opposite direction than that caused by energization of the winding 10.

In operation, when the indicator 1 is in proper correspondence with the indicator arm 46 engagement of the contact 25 with the contact 27 occurs simultaneously with engagement of the contact member 21 with the contact 15, thereby rendering the electron discharge devices 58, 62 conducting at the same instant, resulting in equal and opposite forces being impressed upon the rotor 6 so that it is not urged to rotation in either direction. Upon a change in the position of the indicator arm 46, however, the instant of engagement of the contact member 21 with the contact 15 will be advanced or retarded depending upon the sense of the change in position of the indicator arm 46 so that for a proportionate increment of time either winding 9 or 10 only will be short circuited, thereby producing rotation of the rotor 6 in a direction to vary the instant of engagement of the contact member 25 with the contact 27 until it again occurs simultaneously with that of the contact member 21 and contact 15.

The motor 33 is shown connected in series with the primary of a transformer 74 across the source 12. When the secondary of the transformer 74 is close circuited the impedance of the primary is such as to allow operation of the motor 33. When, however, the secondary is open circuited the impedance is increased so that the motor 33 is substantially deenergized and rendered inoperative. As in Fig. 1 the contacts 50 and 51 are arranged for successive operation so that if the cam 28 is in the same phase relationship with respect to the motor 33 as is the cam 23 with respect to the motor 39, the secondary of the transformer is continuously short circuited. When, however, such similar phase relationship does not exist the secondary is open circuited through operation of either the contacts 50 or 51, thereby deenergizing the motor 33 for a portion of each revolution of the motor 39 until proper relationship is again restored.

The contact 51 is connected by the conductor 72A to a grid 75 of an electron discharge device 76 having an anode 77 and a cathode 78. The grid 75 is connected through a resistance 79 to the conductor 71. Normally the electron discharge device 76 is non-conducting. When, however, the contact 51 is closed a potential substantially equal to that of the cathode 78 is impressed upon the grid 75, thereby rendering the device conducting during each half cycle when the anode 77 is positive with respect to the cathode 78. The secondary of the transformer 74 is connected in the output circuit of the device 76 by means of conductors 80, 81 whereby closure of the contact 51 is effective for short circuiting the secondary.

The contact 50 is connected in parallel with the device 76 across the secondary of the transformer 74. Therefore, closure of the contact 50 is likewise effective for short circuiting the secondary winding of the transformer 74. In order that closure of the contact 50 may establish the same current in the secondary winding of the transformer 74 as does closure of the contact 51, I show connected in series with the contact 50 a variable impedance 82.

Figure 4:
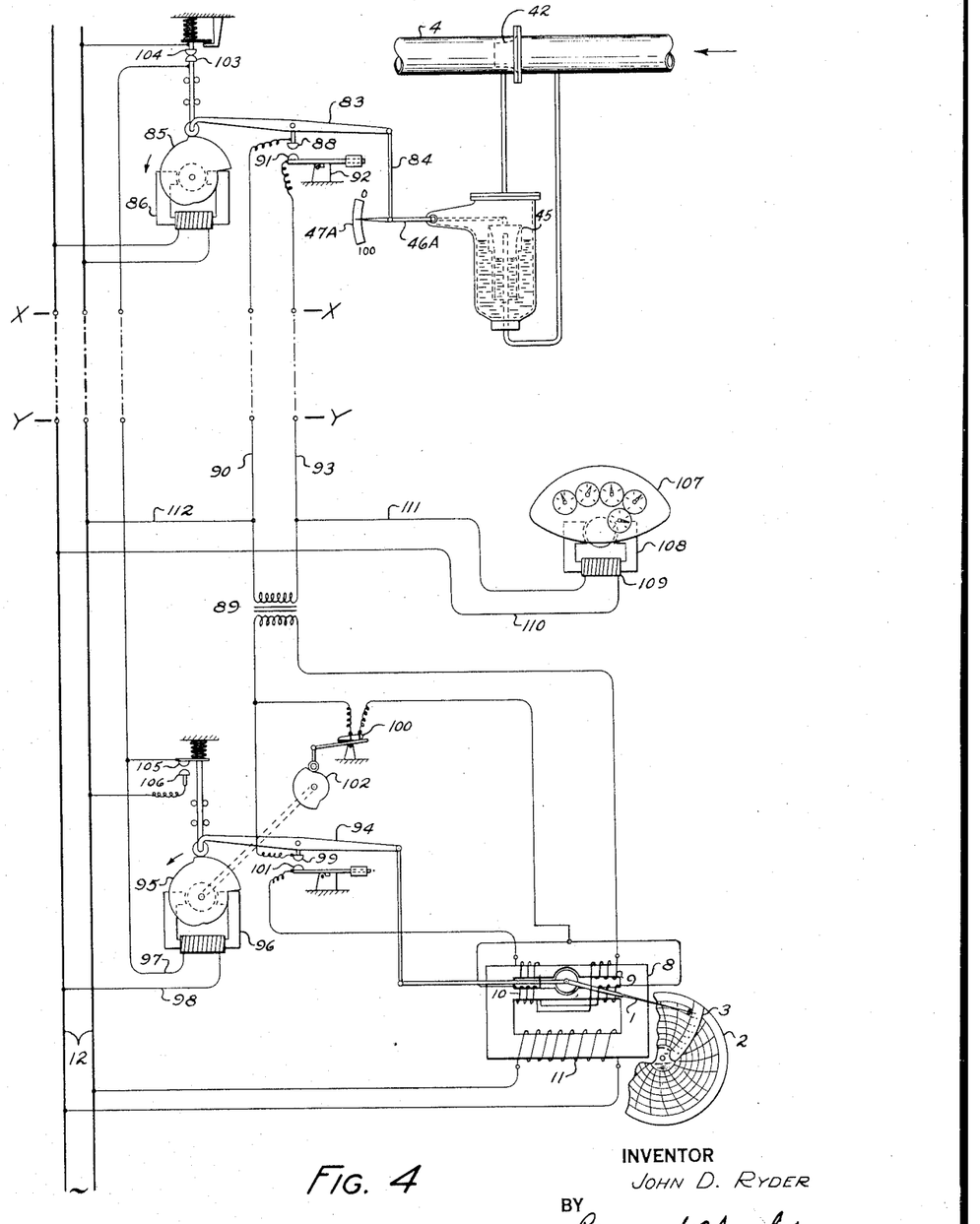
Fig. 4 illustrates diagrammatically a modified form of my invention.

In Fig. 4 I show a modified form of my invention in combination with some of the features disclosed in a pending application to W. E. Dueringer, Serial No. 63,617 filed in the United States Patent Office on February 12, 1936. The bell 45 positions one end of a beam 83 to which it is pivotally connected by a member 84 and an indicator arm 46A which may be adapted to indicate the rate of flow by its position relative to a scale 47A.

The opposite end of the beam 83 is periodically reciprocated by a shaped cam 85 continuously rotated by a motor 86 connected to the source 12. Carried by the beam 83 is a contact 88 connected to one side of the secondary of a transformer 89 by a conductor 90. A cooperating contact 91 pivoted to a stationary support 92 is connected to the opposite side of the secondary by a conductor 93. Engagement of the contact 88 with the contact 91 serves to short circuit the secondary of the transformer 89.

In the receiving station the motor 8 is arranged to position one end of a beam 94, the other end of which is periodically reciprocated by a cam 95 rotated by a synchronous motor 96 connected to the source 12 through conductors 97, 98. Carried by the beam 94 is a contact 99 connected to one side of the winding 10 through a mercury switch 100. A cooperating contact 101 is connected to the opposite side of the winding 10. With the mercury switch in closed position, engagement of the contact 99 with the contact 101 serves to short circuit the winding 10.

The mercury switch 100 is arranged to be periodically actuated by a cam 102 secured to the rotor of the motor 96. Short circuiting of the mercury switch 100 serves to permit short circuiting of the winding 10 by engagement of the contact 99 with the contact 101, or short circuiting of the winding 9 by engagement of the contact 88 with the contact 91.

The cams 85 and 95 are identical in contour, having a raised circular portion of approximately 90 degrees, a depressed circular portion of approximately 90 degrees, and a rising portion of approximately 180 degrees. The position of the cam 102 relative to the cams 85 and 95 is normally such that during the rising portion the mercury switch 100 is closed. If therefore engagement of the contact 88 with the contact 91 occurs during this period, winding 9 will be short circuited, and if engagement of the contact 99 with the contact 101 occurs the winding 10 will be short circuited. At the termination of the rising portion the mercury switch 100 is arranged to open so that during the remaining half cycle of each cam revolution the windings 9 and 10 remain deenergized, notwithstanding that the contact 88 engages the contact 91, or that the contact 99 engages the contact 101.

In operation the cam 95 is first brought into agreement with the cam 85 so that at any instant their points of contact with the beams 94 and 83 are identical. The contact 88 engages the contact 91 and the contact 99 engages the contact 101 during the depressed portion of the cams 85 and 95 respectively. The cam 102 is arranged to close circuit the mercury switch 100 at the instant the rising portions of the cams 85, 95 begin to pass under the beams 83, 94, thereby simultaneously short circuiting the windings 9, 10. The contact 88 will remain in engagement with the contact 91 an increment of time depending upon the position of the indicator arm 46A. Likewise the contact 99 will remain in engagement with the contact 101 an increment of time depending upon the position of the indicator 1. If the position of the indicator 1 is in proper correspondence, recording the same rate of flow as the indicator arm 46A, the contacts 88, 91 and 99, 101 will break at the same instant, thereby open circuiting the windings 9, 10 simultaneously so that the motor 8 is not urged to rotation throughout the cycle of operation.

If a change in flow through the conduit 4 occurs, positioning the indicator arm 46A in a counterclockwise direction a proportionate amount, the contact 88 will remain in engagement with the contact 91 for a longer increment of time. The winding 9 will then remain short circuited after the winding 10 has been open circuited, effecting rotation of the motor 8 in a direction to move the indicator 1 upwardly with respect to the chart 2. Simultaneously with the indicator 1 the beam 94 will be positioned in a clockwise direction, so that upon the next cycle of operation the contact 99 will remain in engagement with the contact 101 for a longer increment of time. Such operation will continue until the indicator 1 is brought into proper correspondence with the indicator arm 46A, when the contacts 99, 101 will disengage at the same instant as the contacts 88, 91. Upon a decrease in the rate of flow through the conduit 4 the reverse operation will take place, the contact 88 disengaging the contact 91 before the contact 99 disengages the contact 101, thereby permitting the winding 10 to be short circuited for a longer increment of time than the winding 9. The motor 8 will then operate to position the indicator 1 downwardly, at the same time positioning the beam 94 in a counterclockwise direction to decrease the length of the increment of time during which the contact 99 is in engagement with the contact 101.

During the raised and depressed portions of the cams 85, 95 the relative positions of the cams are compared and if out of agreement the motor 96 is periodically deenergized until such agreement is reestablished. This operation I perform by substantially the same method as described with reference to Fig. 1.

The cams 85, 95 are shown in Fig. 4 at the beginning of the phasing cycle. A contact 103 actuated by the cam 85 is shown in engagement with a contact 104 which is connected to the source 12; and a contact 105 actuated by the cam 95 is shown disengaged from a contact 106, connected to the source 12. The motor 96 is thus energized from the source 12 through contacts 103 and 104. At the termination of the raised portion if the cams 85 and 95 are in proper correspondence the contact 105 will engage the contact 106 at the instant the contact 103 disengages the contact 104, so that the motor 96 will be continuously energized. If, however, the cam 95 lags the cam 85 the contacts 103, 104 will disengage before contacts 105, 106 engage. The motor 96 will then remain deenergized until the contacts 103, 104 engage during the next cycle of operation. The cam 95 will then lead the cam 85 during the succeeding cycle until the contacts 105 and 106 disengage at the beginning of the raised section of cam 95. The motor 96 will then remain deenergized until the cam 85 closes contacts 103 and 104, when the two cams will again be in proper angular relation to each other. If the cam 95 leads the cam 85 the motor 96 will then be deenergized at the beginning of the raised portion of cam 95 and remain deenergized until the contacts 103 and 104 engage, when the two cams will again be in proper correspondence.

A feature of my invention as disclosed in Fig. 4 resides in the circuit arrangement whereby I am able to operate receiving devices of divergent characteristics. The windings 9, 10 of a motor such as 8 are necessarily designed to carry only the current and potential induced by the winding 11. By utilizing the transformer 89 between the contacts 88, 91 and winding 9 I may utilize them to actuate devices requiring greater or lesser potential, or current, than that required by the winding 9 without in any way affecting the operation of the motor 8.

Referring to Fig. 4 I therein show a register 107 for exhibiting the total flow through the conduit 4 over a period of time. The register is connected through suitable reducing gears (not shown) to a self-starting synchronous motor 108 having a field 109. The field 109 is connected to one side of the source 12 through a lead 110, the opposite side of the winding being connected to conduit 93 through lead 111 and thence through contacts 91, 88, conduit 90 and lead 112 to the opposite side of the source 12. When the contacts 88, 91 are disengaged the field 109 is deenergized and the motor 108 does not rotate. Upon engagement of the contacts 88, 91 the field 109 is energized and the register actuated at a constant rate of speed. As hereinbefore explained the increments of time during which the contacts 88, 91 are engaged are proportional to the rate of flow of fluid through the conduit 4. Accordingly the register 107 will be actuated at a constant speed for increments of time proportional to the rate of flow of fluid through the conduit 4 and will exhibit the total flow of fluid passing through the conduit during successive readings.

While in Fig. 4 I have disclosed cams 85, 95 having a particular shape, it is apparent that the shape of the rising sections may be varied as necessary to obtain desired increments of time during which the contacts 88, 91 and 99, 101 are engaged. It is further apparent that the raised and depressed portions of the cams may be made greater or less than the 90 degrees herein given as one example. Under some conditions it may also be desirable to provide cams such as indicated at 85, 95 having a plurality of rising portions, as well as one or more sections during which the relative angular positions of the two cams are compared.

Figure 5:
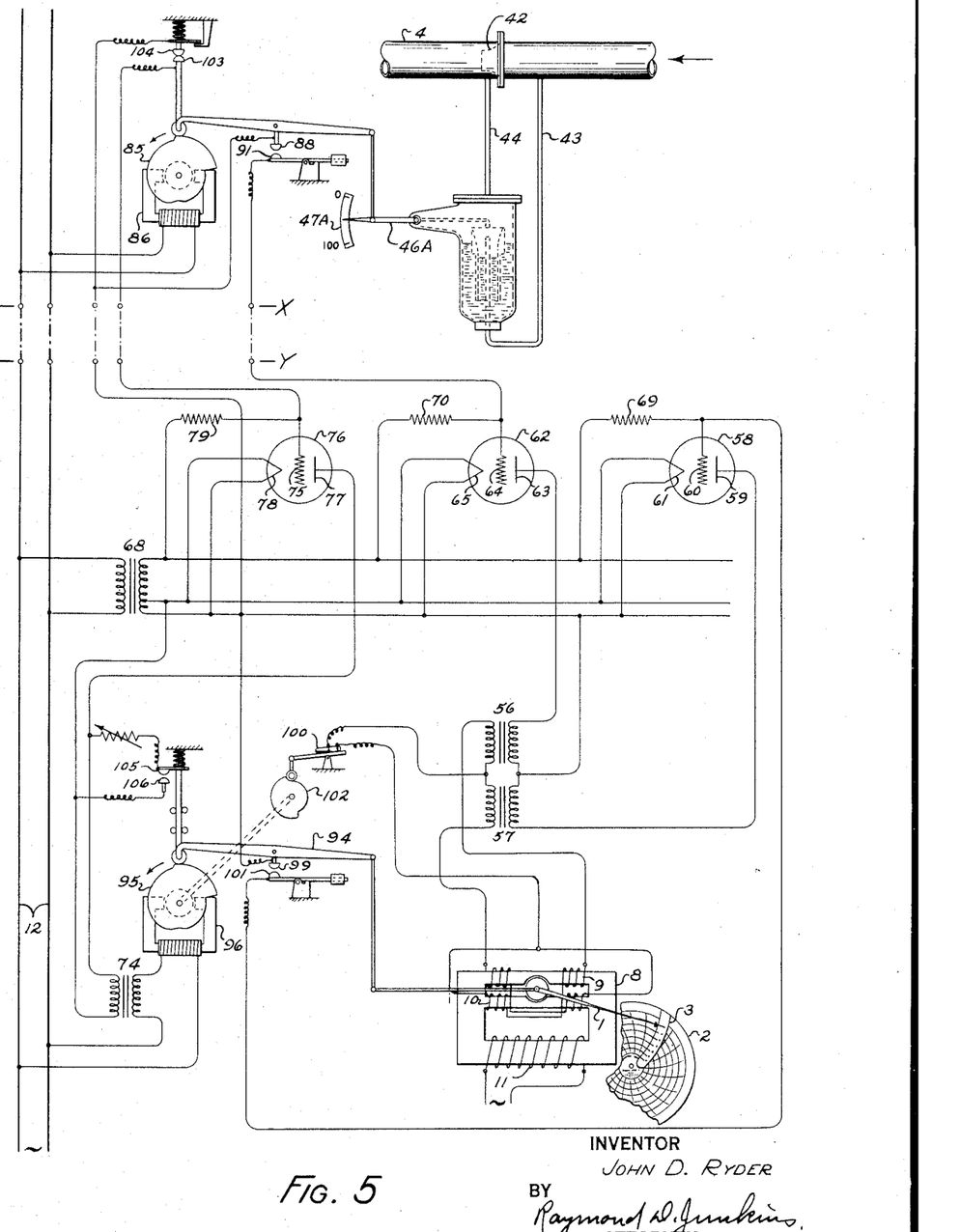
Fig. 5 illustrates a further alternate form of circuit arrangement adapted for use with my invention as disclosed in Fig. 4.

In Fig. 5 I illustrate an embodiment of my invention combining certain circuit features of Fig. 3 with the mechanical arrangement of apparatus shown in Fig. 4. Therein closure of the contact 88 with the contact 91 serves to vary the potential of the grid 64 relative to the cathode 65 to render the electron discharge device 62 conducting, thereby short circuiting the secondary of the transformer 56, decreasing the impedance of the primary sufficiently so that the winding 9 of the motor 8 is substantially short circuited. Similarly engagement of the contact 99 with the contact 101 varies the potential of the grid 60 relative to the cathode 61 so that the electron discharge device 58 is rendered conducting, thereby short circuiting the secondary of the transformer 57, serving to reduce the impedance of the primary sufficiently so that the winding 10 is substantially short circuited. If the windings 9 and 10 are energized simultaneously by engagement of contacts 99, 101 and 88, 91 the motor 8 is not urged to rotation in either direction. However if the contact 88 engages the contact 91 before or after engagement of the contact 99 with the contact 101, due to a variation in the rate of flow through the conduit 4, the motor 8 will rotate in a direction to restore proper correspondence between the indicator arm 46A and the indicator 1, when simultaneous engagement of the contacts 88, 91 and 99, 101 will again occur.

During each revolution of the cams 85 and 95 their relative positions are compared as in the embodiment illustrated in Fig. 4. Closure of contact 103 with contact 104 serves to vary the potential of the grid 75 relative to the cathode 78 to render the electron discharge device 76 conducting, thereby short circuiting the secondary of the transformer 74. Closure of the contact 105 with the contact 106 likewise serves to short circuit the secondary of the transformer 74. Under normal operation so long as the cam 95 remains in proper position relative to the cam 85, the contacts 105, 106 and 104, 103 maintain the secondary of the transformer 74 continuously short circuited and the motor 96 thereby energized. If the cam 95 loses step with the cam 85 the proper sequence of operation of contacts 105, 106 and 104, 103 will be destroyed and the motor 96 periodically deenergized until the cams 95 and 85 are again brought into proper alignment.

Figure 6:
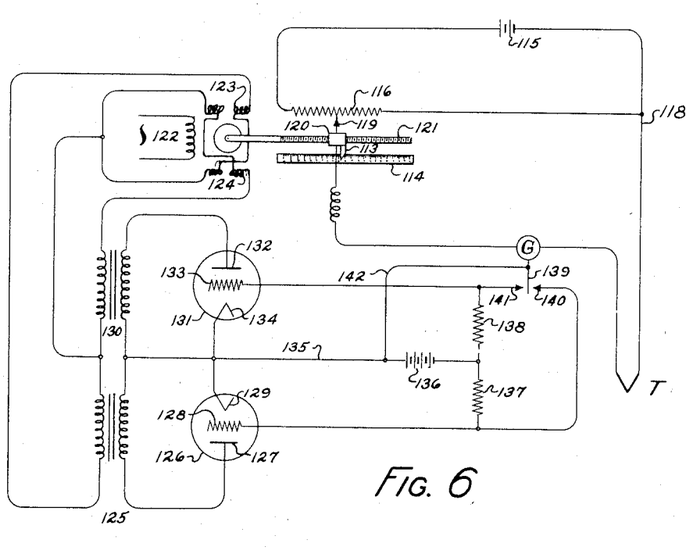
Fig. 6 illustrates diagrammatically a further modified form of my invention.

In Fig. 6 I illustrate a modified form of my invention arranged to position an indicator 113 relative to a scale 114 to exhibit the temperature to which a thermocouple T is sensitive. The thermocouple T is connected to a conventional potentiometer circuit comprising a source of potential 115 and a slide wire resistance 116 at junction 118 and contact 119. The contact 119 is positioned along the slide wire resistance 116 and the indicator 113 is moved relative to the scale 114 by a nut 120 threaded to a screw 121 rotated by an induction motor 122 having wound opposed shading poles 123 and 124.

Connected in circuit with the winding 123 is the primary of a transformer 125, the secondary of which is connected in the output circuit of an electron discharge device 126 having an anode 127, a grid 128 and a cathode 129. The winding 124 is likewise connected in circuit with the primary of a transformer 130, the secondary of which is connected in the output circuit of an electron discharge device 131 having an anode 132, a grid 133 and a cathode 134. The cathodes 129 and 134 are connected to a common conductor 135 and may, if desired, be provided with current to maintain a desired temperature as well known.

When the electron discharge devices 126 and 131 are non-conducting, the impedance of the primaries of the transformers 125, 130 is sufficient that the windings 123, 124 are substantially open circuited and the motor 122 is not urged to rotation. With the electron discharge device 126 rendered conducting, the impedance of the primary of the transformer 125 is reduced sufficiently so that the winding 123 is substantially short circuited and the motor 122 rotates to move the nut 120 in desired direction. Conversely when the electron discharge device 131 is conducting, the winding 124 is substantially short circuited, moving the nut 120 in opposite direction.

The grids 128, 133 are shown connected to the common conductor 135 through a source of potential 136 and resistances 137, 138 respectively. The source of potential 136 is arranged so that normally the grids 128, 133 are negative with respect to their cathodes 127, 134, thereby rendering the electron discharge devices 126, 131 nonconducting.

Connected in circuit with the thermocouple T is a galvanometer G having a movable member 139 which upon displacement from the neutral position in one direction engages a contact 140 and upon displacement in the opposite direction engages a contact 141. A conductor 142 connects the movable member 139 with the conductor 135 between the source of potential 136 and the cathodes 129, 134. When the movable member 139 engages the contact 141 the resistance 138 is short circuited and a potential equal to that of the cathode 134 is impressed upon the grid 133 of the electron discharge device 131. With the grid 133 at the same potential as the cathode 134 the device 131 is rendered conducting, serving to short circuit the secondary of the transformer 130 and reducing the impedance of the primary sufficiently so that the winding 124 is substantially short circuited, effecting rotation of the motor 122 in desired sense. Displacement of the movable member 139 in opposite direction to engage the contact 140 serves to short circuit the resistance 137 impressing a potential upon the grid 128 equal to that of the cathode 129, thereby substantially short circuiting the winding 123 and causing the motor to operate in opposite direction.

In operation, assuming that the potential drop between the junction 118 and contact 119 through the slide wire resistance 116 is equal to, but opposed to that generated by the thermocouple T, the movable member 139 of the galvanometer G will be in the mid or neutral position. Upon a change in temperature of the thermocouple T, for example an increase, the movable member 139 of the galvanometer G will be displaced from the neutral position and engage contact 141. The motor 122 will then rotate in a direction to move the contact 119 along the slide wire resistance 116 until the potential drop between the junction 118 and contact 119 is again equal to that generated by the thermocouple T, when the movable member 139 will again be restored to the neutral position, disengaging the contact 141 and rendering the electron discharge device 131 nonconducting.

Conversely, assuming a decrease in temperature of the thermocouple T, the movable member 139 will be displaced from the neutral position engaging the contact 140 rendering the electron discharge device 126 conducting, which will serve to substantially short circuit the winding 123 so that the motor 122 will rotate in a direction to decrease the potential drop between the junction 118 and contact 119 until the movable member 139 is again restored to the neutral position.

While I have illustrated certain modifications of my invention it is apparent that further changes can be made without departing from the spirit and scope of my invention as expressed by the appended claims.

What I claim as new and desire to secure by Letters Patent of the United States, is:

1. In a telemeter, in combination, a rotatable cam, a synchronous motor having a rotor for driving and axially supporting said rotatable cam, means for angularly positioning said cam and motor about said rotor as a center in accordance with the magnitude of a variable, a positioning motor having opposed windings, contact means actuated by said cam for periodically energizing one of said windings in accordance with the magnitude of the variable, a second rotatable cam, a second synchronous motor having a rotor for driving and axially supporting said second rotatable cam, said second motor and cam positioned about the rotor or said second synchronous motor as a center by said positioning motor, and contact means actuated by said second cam for periodically energizing the other of said windings in accordance with the position of said positioning motor.

2. In a telemetric system for reproducing position, in combination, a pair of constant speed synchronously rotating cams, a reference point on each of said cams normally in predetermined phase relationship, means for positioning one of said cams to vary said phase relationship, and means under the joint control of said cams for positioning the other of said cams to restore the original phase relationship between said reference points.

3. In a telemetric system for reproducing position, in combination, a pair of constant speed synchronously rotating cams, a contact periodically actuated by each of said cams normally in predetermined phase relationship, means for angularly positioning one of said cams to vary said phase relationship, and means for restoring the predetermined relationship after departure therefrom including an electric motor having opposed windings, one of said opposed windings connected in circuit with one of said contacts, the other of said windings connected in circuit with the other of said contacts.

4. In a telemetric system for reproducing position, in combination, a pair of synchronously rotating cams, a contact periodically actuated by each of said cams normally simultaneously, means for angularly positioning one of said cams to advance or retard actuation of one of said contacts relative to the other, and means for restoring said contacts to simultaneous actuation including an electric motor for positioning the other of said cams and having opposed windings, one of the windings energized by actuation of one of said contacts, the other of said windings energized by actuation of the other of the contacts.

5. In a telemeter in combination, a transmitting station comprising an electric motor, a cam rotated by said motor, means for angularly positioning said cam and motor about its center of rotation in accordance with the magnitude of a variable, and stationary contact means actuated by said cam; a receiving station comprising a second motor, a second cam rotated by said second motor, a second stationary contact actuated by said second cam, means for angularly positioning said second cam about its center of rotation to maintain a desired phase relationship between said cams and a reversible motor for operating said last named means having a winding energized by actuation of the transmitting stationary contact and an opposed winding energized by actuation of the receiving stationary contact.

6. In a telemeter, in combination, an induction motor having a wound shading pole, an electron discharge device having an input and an output circuit, means responsive to the magnitude of a variable for controlling the input circuit of said device, and a transformer, the secondary of said transformer connected in the output circuit of said electron discharge device and the primary connected in circuit with said wound shading pole.

7. In a telemeter, in combination, a reversible induction motor having opposed wound shading poles, short circuiting of one of said windings producing rotation in one direction, and short circuiting of the other of said windings producing rotation in opposite direction, means for short circuiting said windings comprising a pair of transformers, the primary of each connected in circuit with one of said opposed windings, and means for electrically controlling the secondaries of said transformers sensitive to the magnitude of a variable.

8. In a telemeter, in combination, a transmitter comprising a movable member, means for moving said member through a predetermined cyclic course, a receiver comprising a second movable member, means for moving said second member through an identical cyclic course in synchronism with said first member, means positioned in accordance with the magnitude of a variable for positioning said first member to vary the phase relationship between said first and second members in accordance with changes in the magnitude of said variable, and means for restoring said members to the predetermined phase relationship comprising, a reversible induction motor having opposed wound shading poles for positioning said receiving member, a pair of transformers, the primary of each connected to one of said opposed windings, a pair of electron discharge devices having an input and an output circuit, the secondary of each of said transformers connected in the output circuit of one of said devices, means actuated by said transmitting member for controlling the input circuit of one of said devices, and means actuated by said receiving member for controlling the input circuit of the other of said devices.

9. In a telemeter, in combination, an induction motor having a wound shading pole, a transformer, one of the windings of said transformer connected in circuit with said wound shading pole, means responsive to the magnitude of a variable for periodically short circuiting the other winding of said transformer for increments of time proportional to the magnitude of a variable, a source of alternating potential, and a self-starting synchronous motor connected to said source in series with said first named means.

10. In a telemeter, in combination, an electric circuit, a motor in said circuit having two similar opposed windings, whereby when either winding is energized the motor rotates in a given direction, and when both windings are energized the motor is not urged to rotation, a rotatable cam, a time actuated element for continuously rotating said cam, an element responsive to the value of a variable for angularly positioning said cam about its center of rotation, an electron discharge device having an anode, a cathode and a grid; a transformer, the primary connected in circuit with one of said windings, and the secondary connected in circuit with said anode and cathode, means actuated by said cam to vary the grid bias to render said electron discharge device conducting to permit the then energized winding to rotate the motor in one direction, a second cam, a second time actuated element for continuously rotating said cam, a second element moved by said motor for angularly positioning said cam about its center of rotation, and means actuated by the second cam to energize the other winding of said motor to rotate said motor in opposite direction.

11. In a telemeter, in combination, an electric circuit, a motor in said circuit having two similar opposed windings, whereby when either winding is energized the motor rotates in a given direction, and when both windings are energized the motor is not urged to rotation, a rotatable cam, a time actuated element for continuously rotating said cam, an element responsive to the value of a variable for angularly positioning said cam about its center of rotation, an electron discharge device having an anode, a cathode and a grid; a transformer, the primary connected in circuit with one of said windings and the secondary connected in circuit with said anode and cathode, means actuated by said cam to vary the grid bias to render said electron discharge device conducting to permit the then energized winding to rotate the motor in one direction, a second cam, a second time actuated element for continuously rotating said cam, a second element moved by said motor for angularly positioning said cam about its center of rotation, a second electron discharge device having an anode, a cathode, and a grid, a second transformer, the primary connected in circuit with the other of said windings and the secondary connected in circuit with the anode and cathode of said second electron discharge device, and means actuated by said second cam to vary the grid bias to render said second electron discharge device conducting to energize the other winding of said motor to rotate said motor in opposite direction.

12. In a telemetric system, in combination, a transmitting station comprising a rotatable cam, contact means actuated by said cam, a synchronous motor having a rotor for axially supporting and rotating said cam, means for positioning said motor and cam about said rotor as a center to advance or retard the operation of said contact means; a receiving station comprising a rotatable cam, contact means actuated by said cam, a synchronous motor having a rotor for rotating and axially supporting said cam, and a motor having opposed windings disposed at said receiving station for angularly positioning said last named synchronous motor and cam about the rotor of said last named synchronous motor to maintain operation of said last named contact means coincident with the operation of said first named contact means, one of said opposed windings adapted to be energized by operation of said first named contact means and the other opposed winding adapted to be energized by operation of said second named contact means.

13. In a telemetric system, a transmitter comprising means for cyclically producing electric signals of predetermined time duration and means for varying the time duration of said signals from said predetermined value in accordance with changes in a variable; and a receiver comprising means responsive to said signals and means including said last named means for restoring said signals to said predetermined time duration after departure therefrom.

14. In a telemetric system having a transmitter, a receiver, and an electric circuit connecting said receiver with said transmitter, means adapted to cyclically produce in said circuit electric signals of a predetermined time duration, said transmitter comprising means for varying the time duration of said signals in accordance with changes in the magnitude of a variable, and said receiver comprising means responsive to said signals, and means including said last named means for restoring said signals to said predetermined time duration.

15. In a telemetric system having a transmitter, a receiver and an electric circuit connecting said receiver with said transmitter, said transmitter and receiver comprising cooperating means for cyclically producing in said circuit an electric impulse of constant predetermined time duration, said transmitter comprising means for varying the start of said signal in each cycle of operation in accordance with the magnitude of a variable, and said receiver comprising means responsive to said signals and adapted to vary the stopping of said signal in each cycle of operation to maintain said signals of predetermined time duration.

16. In a telemetric system, a first transmitting means for cyclically telemetering signals of a predetermined constant time duration, a second transmitting means for normally cyclically telemetering signals equal in time duration to said first named signals but adapted to alter the time duration of said signals in correspondence with changes in the magnitude of a variable, and means under the joint control of said first and second named signals for restoring said second signals to said predetermined constant time duration.

17. In a telemetric system, a first transmitting means for cyclically originating a first electric signal, means in said transmitter for altering the start of said first signal in each cycle of operation in accordance with changes in the magnitude of a variable, a second transmitting means for cyclically originating a second electric signal, and means for simultaneously terminating both said signals after said second signal has existed for a predetermined constant increment of time, receiver means jointly responsive to said signals and means under the control thereof to alter the start of said second signal in each cycle of operation so as to make it coincident with the start of said first signal.

18. In a telemetric system, a first transmitting means for cyclically originating a first electric signal, means in said transmitting means for altering the time of starting said first signal in each cycle of operation in accordance with changes in the magnitude of a variable, a second transmitting means for cyclically originating a second electric signal, and means for simultaneously terminating both said signals after said second signal has existed for a predetermined constant increment of time, and receiver means under the joint control of said signals.

19. In a telemetric system, a first transmitting means for cyclically originating a first electric signal, means in said transmitter for altering the time of starting said first signal in each cycle of operation in accordance with changes in the magnitude of a variable, a second transmitting means for simultaneously cyclically originating a second electric signal, means for simultaneously terminating both said signals after said second signal has existed for a predetermined constant increment of time, receiver means comprising a motor having a winding energized during the existence of said first signal, and an opposed winding energized during the existence of said second signal whereby said motor is urged to rotation during each cycle of operation for the difference in time duration of said signals, and means positioned by said motor for altering the time of starting said second signal so as to make it coincident with the time of starting said first signal.

20. In a telemeter, in combination, an induction motor having a shading pole and a winding disposed thereon, short circuiting of said winding producing rotation of said motor, and means for short circuiting said winding including an electron discharge device having an output circuit energized by said winding and an input circuit controlled in accordance with the magnitude of a variable.

21. In a telemeter system, in combination, a plurality of electron discharge devices each having an input and an output circuit, a motor having a rotor and a plurality of windings for exerting opposed forces on said rotor, each of said windings connected in the output circuit of one of said electron discharge devices, means for periodically energizing the input circuit of one of said devices for increments of time proportional to the magnitude of a variable, means for energizing the input circuit of another of said devices for increments of time proportional to the position of said motor, means for effecting energization of said input circuits concurrently whereby said motor is urged to rotation by the difference in time lengths of energization of the opposed windings.

22. In a telemeter, in combination, an induction motor having a wound shading pole, a transformer, the primary of said transformer connected in circuit with said wound shading pole, means responsive to the magnitude of a variable for periodically short circuiting the secondary of said transformer for increments of time proportional to the magnitude of said variable, a self-starting synchronous motor, a register actuated by said motor, and a source of alternating potential for energizing said motor, said motor connected to said source in series with said first named means.

23. In a control system, an alternating current motor having a continuously energized A. C. field and wire-wound pole-shading means; an actuator having a normal zero position and being movable to either side of the zero position in accordance with the magnitude of a condition; means controlled by the latter and including electron discharge means for controlling the shading of the motor and causing rotation thereof in one direction or the other in accordance with the direction of off-zero movement of said actuator; and means whereby the plate circuit of the electron discharge means is energized from the pole-shading means.

24. In a control system, an alternating current motor having a continuously energized A. C. field and wire-wound shading coils; an actuator having a normal zero position and being movable to either side of the zero position in accordance with the magnitude of a condition; and means controlled by the latter and including an electron discharge means having a plate circuit thereof coupled to and energized by the shading coils on said motor and the grid circuit thereof enters the control of the actuator for controlling the shading of the motor and causing rotation thereof in one direction or the other in accordance with the off-zero movement of the actuator.

25. In a control system, a reversible motor having shading means for controlling the direction of rotation; a movable actuator; means for controlling the operations of the motor including a pair of thermionic devices; a source of alternating current supply for the plates and grids of said thermionic devices including means for supplying positive voltage to the plates from the induced voltages on the shading means of the motor during the time negative voltage is impressed on the grid and vice versa; and means responsive to movement of the actuator for making one or the other of said grids less negative, the particular grid chosen being in accordance with the direction of off-zero movement of the actuator and controlling the direction of rotation of the motor.

26. In a control system, a control shaft adapted to be associated with work-producing means; means for operating the control shaft comprising a reversible shaded pole A. C. motor having a continuously energized field and two sets of wire-wound shading coils, each set being capable of acting oppositely on the rotor of the motor; an electron discharge device system to load through suitable coupling means either set of shading coils to cause rotation of the motor, said system receiving plate energization from the shading coils; an actuator having a zero position and being movable to either side of said zero position depending upon the magnitude of a condition; and means responsive to movements of the actuator for causing the electron discharge device to function in a manner which results in the loading of one or the other set of shading coils according to the direction of off-zero movement of the actuator, effecting by this action adjustment of the control shaft through the response of the motor.

27. In a control system, an adjustable control shaft adapted to be associated with work-producing means; means for operating the control shaft comprising a reversible motor having a continuously energized field and two sets of wire-wound shading coils, each set capable of acting oppositely on the rotor of the motor; an electron tube system to load through suitable coupling means either set of shading coils to cause rotation of the motor in the desired direction, said means also supplying properly timed charges to the electron tube system from the induced voltage of the shading coils; a movable actuator; and means responsive to movements of the actuator for causing the electron tube system to function in a manner which results in the loading of one or the other set of shading coils according to the direction of movement of the actuator, effecting by this action adjustment of the control shaft through the response of the motor.

28. In a control system, an alternating current motor having a continuously energized A. C. field, a rotor, and wire-wound shading coils on the pole pieces; a control shaft associated with and actuated by rotations of the rotor; an actuator associated with the device; a pair of thermionic devices; circuits controlled by the movements of the actuator connected to the respective grids of the thermionic devices; means coupling the wire-wound shading coils of the motor to the respective plates of the thermionic devices, said means including a step-up transformer whereby voltages induced in the shading coils are increased and impressed on said plates, these voltages being in phase; means including a transformer for impressing in-phase alternating voltages on the grids of the thermionic devices such that a constant phase relationship exists between grid and plate voltages and such that plate voltages are positive when grid voltages are negative; and means connected to the actuator for causing one or the other of the grids, during its intervals of negative polarity, to assume a less negative potential, causing current to flow in the associated plate circuit and making it operative with the associated shading coils which causes the rotor to operate, all depending upon the direction of movement of the actuator and quantitatively in accordance with the extent of such movement.

29. In a control system, a control shaft; means for adjusting the control shaft, including a reversible A. C. motor having a continuously excited field and oppositely disposed wire-wound shading coils; a movable actuator; an electron valve apparatus to function as two separate relays; means for coupling the shading coils of the motor individually to the electron valve relays, said coils supplying charges to the anodes of said electron valves; and means for actuating the relays separately in response to movement of the actuator according to a predetermined direction.

30. In a control system, a control shaft; means for adjusting the position of the control shaft, including a reversible A. C. motor having a continuously excited field and oppositely disposed wire-wound shading coils; an actuator associated with the device; an electron discharge device system; means whereby movement of the actuator causes the electron discharge devices to function selectively according to the direction of the movement and quantitatively with the magnitude of the movement; and means for coupling the plate circuits of the electron discharge device system to the shading coils of the motor for energization therefrom so that functioning of said devices, due to movement of the actuator, loads the shading coils of the motor.

31. In a control system, controlling means to be driven; a reversible A. C. motor having two sets of oppositely disposed wire-wound shading coils connected to said means, each set of coils being capable of acting oppositely on the rotor of the motor; an electron tube system to load, through suitable coupling means, either set of shading coils to cause rotation of the motor in the desired direction; a movable actuator; and means responsive to movements of the actuator for causing the electron tube system to load one or the other set of shading coils according to the direction of movement of the actuator to rotate the motor and its associated means in the desired direction.

32. In a control system, a reversible A. C. motor having a continuously energized A. C. field and wire-wound pole-shading means; means for controlling the direction of rotation of said motor including electron tube means coupled to and energized by said pole-shading means; and means for controlling electron flow in the electron tube means for loading the pole-shading means in such a manner as to cause rotation of the motor in one direction or the other.

JOHN D. RYDER.